United States Patent [19]

Walmsley

[11] 3,901,247

[45] Aug. 26, 1975

[54] END OF LIFE INCREASED PULSE WIDTH AND RATE CHANGE APPARATUS

[75] Inventor: Frank R. Walmsley, Fridley, Minn.

[73] Assignee: Medtronic, Inc., Minneapolis, Minn.

[22] Filed: Jan. 28, 1974

[21] Appl. No.: 437,146

Related U.S. Application Data

[63] Continuation of Ser. No. 217,492, Jan. 13, 1972, abandoned.

[52] U.S. Cl. ..... 128/419 PG; 128/419 PT; 128/422; 307/130; 307/267; 331/113 R; 331/179; 340/249

[51] Int. Cl.$^2$ ........................................... A61N 1/36

[58] Field of Search ............ 128/2.1, 419 C, 419 D, 128/419 E, 419 P, 419 R, 419 S, 420–423; 370/48; 328/64, 65, 113 R, 177 R, 177 V, 179; 340/248 A, 248 B, 248 E, 248 R, 249; 307/126, 130, 267

[56] References Cited

UNITED STATES PATENTS

| | | | |
|---|---|---|---|
| 3,198,195 | 8/1965 | Chardack | 128/419 PG |
| 3,474,353 | 10/1969 | Keller, Jr. | 128/419 PG |
| 3,713,449 | 1/1973 | Mulier | 128/419 PG |
| 3,746,005 | 7/1973 | Thaler et al. | 128/419 PG |
| 3,766,928 | 10/1973 | Goldberg et al. | 128/419 PG |

FOREIGN PATENTS OR APPLICATIONS

| | | | |
|---|---|---|---|
| 1,444,363 | 5/1966 | France | 128/419 PG |

OTHER PUBLICATIONS

"Medical Instrumentation," Vol, 7, No. 1, Jan.–Feb., 1973, p. 22.

*Primary Examiner*—William E. Kamm
*Attorney, Agent, or Firm*—Lew Schwartz; Wayne A. Sivertson

[57] ABSTRACT

Pulse generating circuitry which can be used, for example, in an adjustable pulse width pacemaker. The circuitry increases the output pulse width as the power source output is decreased below a predetermined level and indicates that power source depletion by decreasing the output pulse frequency. The pacemaker pulse width can be matched to the patient's needs and adjusted to pulse widths far below those of the typical pacemaker to conserve battery energy and increase the pacemaker's useful lifetime. The decreasing pulse rate aids in accurately predicting the end of life of the power source.

14 Claims, 3 Drawing Figures

END OF LIFE INCREASED PULSE WIDTH AND RATE CHANGE APPARATUS

This is a continuation of application Ser. No. 217,492, filed Jan. 13, 1972 and now abandoned.

BACKGROUND OF THE INVENTION

Conductive heart defects, commonly referred to as heart blockage, have been significantly controlled by the expanded use of cardiac pacemakers. The use of these pacemakers has brought about a remarkable reduction in the previously high mortality and morbidity from complete heart block. The most common form of cardiac pacemaker in use is the implantable battery-powered type. This type of pacemaker must be replaced when the battery becomes depleted. Replacing an implantable pacemaker requires a surgical operation. Even though this surgery is minor, it should be avoided whenever possible. Thus, implantable pacemaker units should be usable as implanted over an extended period of time, preferably several years, without replacement. Modern implantable pacemaker circuitry typically is reliable and thus, even though the circuitry is designed for low current drain, the depletion of the power source is the usual cause necessitating replacement of the pacemaker.

Determining when to replace the pacemaker has been a problem. As the power source is depleted the output pulse amplitude will decrease; therefore, the pacemaker should, of course, be replaced before its output pulse amplitude is decreased to the point where it becomes insufficient to stimulate heart activity. Experience has shown that depletion of the power supply cells has not been very predictable and that the failure of single cells has been the most common cause of premature pacemaker failure. This necessitated a policy of early prophylactic replacement. Thus, a way of increasing the output pulse energy to sustain heart capture as the power source becomes depleted and a way of accurately predicting power source life has been sorely needed.

In prior art pacemakers, a depletion of the power supply was detected by examining the output pulse for a decrease in amplitude or a change in the pacing rate. This had the disadvantage of requiring the patient to go to the doctor for periodic checks, as this depletion in the pulse amplitude or change in the pacing rate was not detectable by the patient himself. The advantage of having a pacemaker in which the patient can determine whether the power source has become depleted below a predetermined level, thus eliminating the need of the doctor's periodic check, is very clear.

The apparatus of this invention overcomes these difficulties existent in the prior art and provides a long lifetime, adjustable pulse width pacemaker wherein a decrease in the output of the power source is easily detectable and automatically compensable.

SUMMARY OF THE INVENTION

Briefly described, the apparatus of this invention is a pulse generating circuit which can be used, for example, in a cardiac pacemaker system. The inventive apparatus is particularly adaptable for use in an implantable, adjustable pulse width cardiac pacemaker. However, there are other applications in which the present invention could be employed. Such applications might include totally implantable nerve stimulators and other types of implantable muscle stimulators, other than cardiac pacemakers.

The invention provides means for automatically increasing the output pulse width as the output pulse amplitude is decreased due to a depletion of the power source output voltage below a predetermined level. The pulse width increase is adjustable.

In this particular application, the invention further provides a means for adjusting the pulse width extracorporeally. This adjustable pulse width feature compliments the pulse width compensation feature and together they conserve battery energy and increase pacemaker life, by matching the output pulse width to the patient's maximum stimulation requirement. This stimulation requirement does not include a safety factor for the loss in pulse energy due to power source depletion. None is necessary. That loss is automatically compensated for by the pulse width compensation feature of the invention. Consequently, the output pulse width can be safely adjusted to values far below those of prior art pacemakers, thus conserving power source energy and increasing the pacemaker's life.

The invention additionally provides a way for the patient to determine when the pacemaker power source is becoming depleted. A rate slowdown (typically 10%) is used as the indicator of the depletion of the power source below a predetermined level as, for example, when the first cell in the power source becomes depleted. The pacemaker operates at a first predetermined rate when the power source voltage is above the predetermined level and at a second predetermined rate — typically 10% slower than the first predetermined rate — when the power source voltage is below the predetermined level. The patient is able to check whether the pacemaker is operating at the first or the second predetermined rate, and thus determine whether the power source has been depleted below the predetermined level, in sufficient time, so that he may have the pacemaker replaced before its power source becomes depleted to the point that it is no longer capable of stimulating heart activity.

Other features and advantages of the present invention will be set forth or are apparent in the following description and claims and illustrated in the accompanying drawings, which disclose by way of example and not by way of limitation, the principle of the invention and the structural implementations of the inventive concept.

DESCRIPTION OF THE PREFERRED EMBODIMENT

Figure 1:
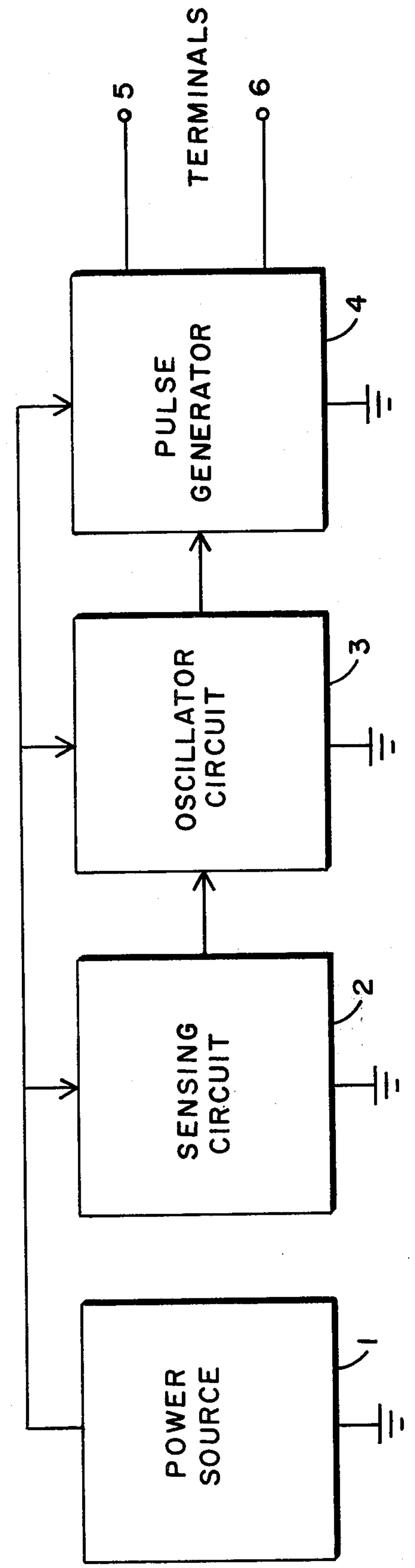
FIG. 1 is a block diagram illustrating basic components in the inventive circuit.

Referring generally to FIG. 1, the inventive circuit includes: power source 1; sensing circuit 2; oscillator circuit 3 for increasing the output pulse width and decreasing the pulse rate; pulse generator 4; and terminals 5 and 6.

The invention provides means for automatically increasing the output pulse width and decreasing the output pulse rate as the output pulse amplitude is decreased due to a depletion of the power source output voltage below a predetermined level. Sensing circuit 2, which is electrically connected to power source 1, is adapted to sense a depletion in the output voltage of power source 1 below the predetermined level. Oscillator circuit 3 is electrically connected to sensing circuit 2 and responsive thereto. Oscillator circuit 3 is further connected in controlling relation to pulse generator 4 for automatically increasing the width of the output pulses generated by pulse generator 4 and decreasing the rate at which pulse generator 4 generates the output pulses. The output pulses generated by pulse generator 4 are transmitted to terminals 5 and 6. These output pulses can be used for a variety of purposes. For example, they can be transmitted to the heart of a living animal via a body implantable electrical lead and used to pace the heart of the living animal.

Figure 2:
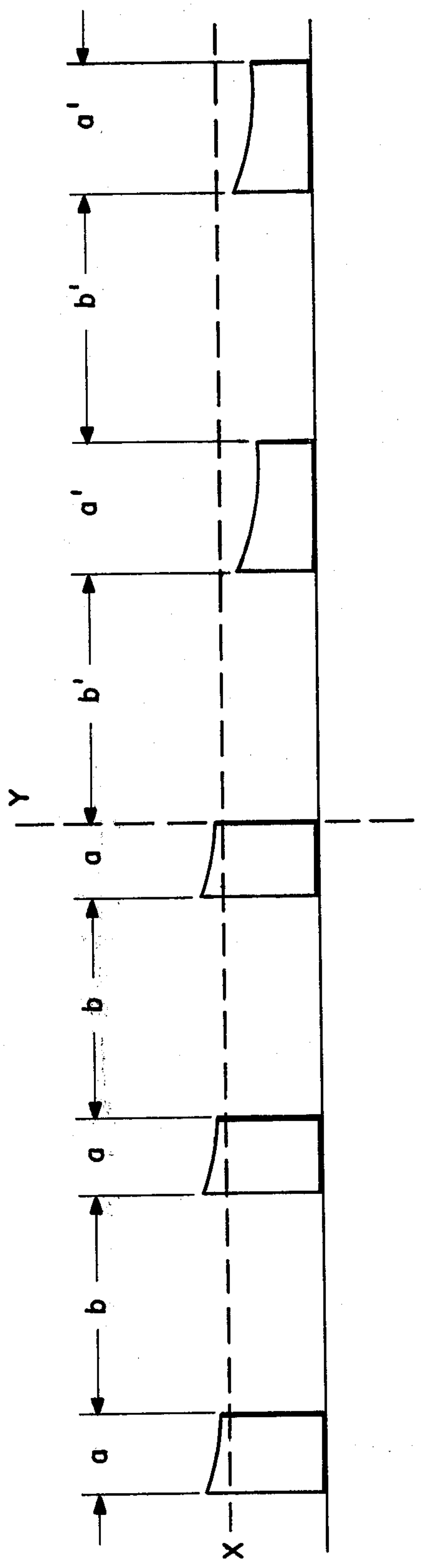
FIG. 2 is a graph illustrating the effect that the inventive circuits pulse width increasing and pulse rate decreasing features have on the shape and rate of the pacemaker output pulses.

FIG. 2 graphically shows the output pulses of the inventive circuit. When the power supply output voltage is above the predetermined level as shown at dotted line X, these output pulses are characterized by a pulse width ($a$) and a pulse interval ($b$).

With reference to FIG. 2, the typical waveform of the output pulses generated by the inventive circuit is shown up to dotted line Y, at which time the power source output voltage abruptly drops significantly below the original level and becomes depleted below the predetermined level X. It can be seen that the output pulse width ($a'$) increases and the interval between pulses ($b'$) also increases, thereby decreasing the rate or frequency of the pulses, when the power source output voltage is abruptly depleted below the predetermined level X.

Figure 3:
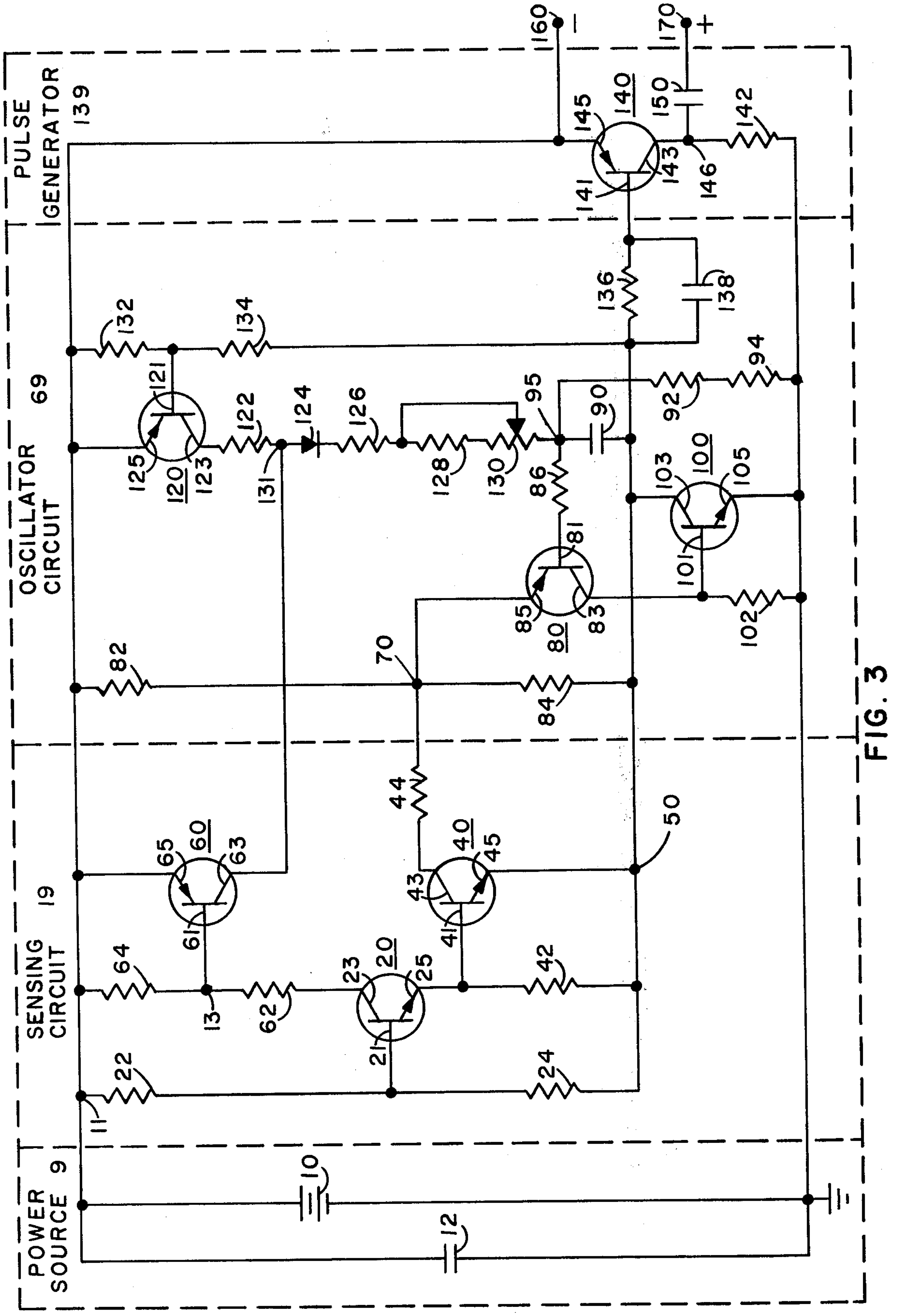
FIG. 3 is a schematic diagram of one embodiment of the inventive circuit.

FIG. 3 is a schematic diagram of one embodiment of the inventive circuit. The particular embodiment shown in FIG. 3 is the circuitry for an asynchronous adjustable pulse width pacemaker system. Shown in this embodiment are: power source 9 including a four-cell storage battery; sensing circuit 19 including transistors 20, 40 and 60 biased so that they can detect a drop in battery voltage below a predetermined level; oscillator circuit 69 including capacitor 90 and transistors 80, 100, and 120, which is responsive to sensing circuit 19; pulse generator 139 comprising a single transistor output stage; and output terminals 160 and 170. Circuits 9, 19, 69 and 139, and terminals 160 and 170 are specific embodiments related, respectively, to blocks 1, 2, 3 and 4 and terminals 5 and 6 of FIG. 1.

In this particular embodiment, power source 9 comprises battery 10 and capacitor 12. Battery 10 is a four-cell battery, each cell having a 1.35V potential, connected with its positive terminal at junction 11 and its negative terminal at the system ground. Capacitor 12 is connected as a filter across battery 10.

Sensing circuit 19 is used to sense the output voltage amplitude of battery 10. More specifically, sensing circuit 19 is used for sensing a decrease in the battery 10 output voltage below a predetermined level. Sensing circuit 19 includes transistors 20, 40 and 60. A pair of resistors 22 and 24 are connected between junction 11 and a junction 50. The collector 23 of transistor 20 is connected through resistors 62 and 64 to junction 11, the base 21 is connected to a junction between resistors 22 and 24 and the emitter 25 is connected directly to the base 41 of transistor 40. A collector 43 of transistor 40 is connected through resistor 44 to junction 70 and the emitter 45 is connected directly to junction 50. Resistor 42 is connected between the base 41 and the emitter 45 of transistor 40, and used to shunt any leakage current through the collector 43 and the base 41 of transistor 40, thus preventing this leakage current from rendering transistor 40 conductive, when transistor 20 is in the nonconductive state. Transistor 60 is connected in the circuit with its emitter 65 connected to the junction 11 and its base 61 connected to junction 13 between resistor 62 and 64.

Transistors 20 and 40 together form a voltage sensor. The direct connection of the emitter 25 of transistor 20 to the base 41 of transistor 40 causes transistors 20 and 40 to act as a unit. Accordingly, transistor 40 conducts whenever transistor 20 conducts; conversely, whenever transistor 20 is nonconductive, transistor 40 will be nonconductive.

The unit comprising transistors 20 and 40 is biased so that it can detect a drop in the output voltage of battery 10 below a certain level. This is accomplished by ratioing resistors 22 and 24, which form a voltage divider biasing the transistor unit (the unit comprising transistors 20 and 40), so that when the voltage at junction 11 is below the predetermined level, for example 5.0 volts, the voltage at the base 21 of transistor 20 will be less than the sum of the transistor 20 and transistor 40 threshold voltages, and thus will be insufficient to render transistor 20 and/or transistor 40 conductive. A drop of voltage below the predetermined level may occur, for example, when one of the cells in battery 10 becomes substantially totally depleted. When this happens, or the voltage at junction 11 drops below the predetermined level from some other cause, the transistor unit cannot be rendered conductive. Transistor 60 is rendered conductive only when the transistor unit conducts. The nonconduction of transistors 20, 40 and 60, when they would normally be conducting, is used to indicate when the output voltage of battery 10 has fallen below the predetermined level X as seen in FIG. 2.

Oscillator circuit 69 is connected so that it is responsive to a decrease in the output voltage of battery 10 sensed by sensing circuit 19; and is adapted to increase the output pulse width and decrease the output pulse rate of the pulse generator 139. A three-stage transistor oscillator is included in the circuitry of oscillator circuit 69 and is adapted for increasing the output pulse width and decreasing the output pulse rate.

One transistor of the three-transistor oscillator is transistor 80. The emitter terminal 85 of transistor 80 is connected to junction 70, which in turn is connected to junction 11 through resistor 82 and to junction 50 through resistor 84. The collector 83 of transistor 80 is connected to ground through resistor 102 and the base 81 is connected to ground through the series combination of resistors 86, 92 and 94. Resistor 84 and capacitor 90 are connected in series between the emitter 85 of transmitter 80 and junction 95 which junction is located between resistors 86 and 92.

Another transistor of the three-stage transistor oscillator is transistor 120. The emitter 125 of transistor 120 is connected to junction 11. The collector 123 of transistor 120 is connected to junction 95 through the series combinations of diode 124, resistors 122, 126 and 128, and potentiometer 130. The wiper arm of potentiometer 130 is connected to a junction between resistors 126 – 128. Transistor 120 is biased by battery 10 through resistor 132. Resistor 132 is inserted between the emitter 125 of transistor 120 and its base 121. The collector 63 of transistor 60 is connected to junction 131 between resistor 122 and diode 124.

In this embodiment, potentiometer 130 is a magnetically coupled potentiometer which is adapted so that it can be adjusted extracorporeally; such a device is generally shown in U.S. Pat. No. 3,569,894, owned by the assignee of this invention, and incorporated herein by reference. Potentiometer 130 comprises a rotatable magnetic device including a hermetically sealed unit. This rotatable device is the implantable portion of a magnetically coupled servo mechanism also including a separate remote magnetic device (not shown) driven by a motor. The implantable device comprising a 1500:1 stepdown gear train and a linear 360° potentiometer is magnetically coupled to the remote device. The remote device is adapted to impart torque to a shaft of the stepdown gear train, thereby driving the linear 360° potentiometer; and thus adjusting the resistive value of potentiometer 130.

The remaining transistor of the three-transistor oscillator is transistor 100. Its emitter 105 is connected directly to ground and its collector 103 is connected to junction 50, and is connected via the parallel combination of resistor 136 and capacitor 138 to the base 141 of transistor 140 and via resistor 134 to the base 121 of transistor 120. Resistor 102 is connected between the base 101 of transistor 100 and the system ground. Connecting resistor 102 in this manner biases transistor 100 at some positive voltage.

A three-stage transistor oscillator is formed by the above-described electrical connections between transistors 80, 100 and 120. Since the base 101 of transistor 100 and the collector 83 of transistor 80 are directly connected, whenever transistor 80 conducts it supplies a base drive to transistor 100 which is effective to render transistor 100 conductive. When transistor 100 conducts the voltage at its collector 103—junction 50—decreases. This decrease is felt at the base 121 of transistor 120 and is effective to pull it into a conductive state. Consequently, when transistor 80 is rendered conductive, transistor 100 will become conductive which will pull transistor 120 conductive. Conversely, when transistor 80 is rendered nonconductive, transistors 100 and 120 will become nonconductive.

In this pacemaker embodiment, pulse generator 139 has a single transistor output stage, for generating output pulses. Pulse generator 139 comprises transistor 140, resistor 142 and capacitor 150. Transistor 140 has its emitter 145 connected to junction 11 and its collector 143 connected to junction 146 between capacitor 150 and resistor 142. The base 141 of transistor 140 is connected to and biased by oscillator circuit 69. Specifically the base 141 of transistor 140 is connected to the parallel combination of resistor 136 and capacitor 138. Resistor 142 is connected between capacitor 150 and the system ground.

Output terminals 160 and 170 are electrically connected to an electrical lead (not shown) to transmit a pulse to pace the heart. The pacing pulse is generated when capacitor 150 discharges. The discharge path of capacitor 150 is from terminal 170 through the heart to terminal 160, and then through conducting transistor 140. Capacitor 150 is charged, when transistor 140 is in the nonconductive state, by battery 10 through terminal 160, the heart, terminal 170, and resistor 142 to the system ground.

The general operational function of any pacemaker is, of course, to supply an electrical pulse for pacing the heart. A novel operational aspect in the performance of that general function with this pacemaker embodiment is the automatic increase in the output pulse width as the output amplitude of the power source voltage becomes decreased below a certain level. Another novel operational aspect is the pulse rate slowdown (typically 10%) accompanying this pulse width increase. This decrease in the pulse rate is used as an indicator of a depletion in the power supply voltage output. The operation of this pacemaker embodiment can be best understood by looking at the electrical circuit of this embodiment of a pacemaker in two situations; namely when the oscillator is in the nonconductive "off" state and when it is in the conductive "on" state.

When the oscillator is in the "off" state, all of the transistors are in a nonconductive "off" state. The charge is accumulated on capacitor 90 during the "on" state of the oscillator, and leaks "off" (discharges) through a discharge path that includes resistors 92 and 94, battery 10, resistor 82, and resistor 84.

Capacitor 90 will continue to discharge via this path until transistor 80 becomes conductive (turns "on"). Transistor 80 will turn "on" when the voltage from the base 81 of transistor 80 to its emitter 85 reaches a certain level, for example about 0.4V. Since resistor 84 is small and the discharge current is small, there will be very little voltage drop across resistor 84. There is essentially no voltage drop across resistor 86. Consequently, capacitor 90 will continue to discharge until the voltage on it essentially balances the turn "on" voltage of transistor 80. At this time transistor 80 will become conductive.

When transistor 80 becomes conductive, it pulls transistor 100 "on" which pulls transistor 120 "on." Thus, when transistor 80 becomes conductive, the oscillator is pulled into its "on" state. The collector 103 of transistor 100 is connected to the bases 21 and 141 of transistors 20 and 140; and thus when transistor 100 becomes conductive it normally — when the battery 10 output voltage is greater than the predetermined level — pulls transistor 140 and the transistor unit comprising transistors 20 and 40 conductive. When the transistor unit becomes conductive it pulls transistor 60 conductive. Consequently, when the oscillator is in the "on" state all the transistors in the circuit are normally conductive. All the transistors will normally remain conductive until transistor 80 is turned "off," as will be explained later. When transistor 80 turns "off" there will be no base drive for transistor 100, so transistor 100 will be turned "off," and transistor 100 will pull transistors 120, 140 and the transistor unit comprising transistors 20 and 40 "off" when it is pulled "off" by transistor 80. When the transistor unit is pulled "off," it pulls transistor 60 "off." The oscillator is now in the "off" state and all the transistors in the circuit are "off".

The time the oscillator is in the "on" state is the time that it takes to charge capacitor 90. This time is essentially equivalent to the pacemaker pulse width. The moment the oscillator becomes conductive the voltage on capacitor 90 balances the turn "on" voltage of transistor 80. This balance is only momentary as capacitor 90 will charge while transistor 120 and/or transistor 60 is "on" and transistors 120 and 60 can be "on" only as long as transistor 80 is "on." Capacitor 90 is charged while the oscillator is in the "on" state. One charging path is from junction 11 through transistor 120, resistors 122, diode 124, resistors 126 and 128, and potentiometer 130. Another is from junction 11 through transistor 60, diode 124, resistors 126 and 128, and potentiometer 130. Capacitor 90 will continue to charge until the voltage on capacitor 90 substantially equals the voltage at junction 70 less the voltage drop from the base 81 to the emitter 85 of transistor 80. Then transistor 80 will become nonconductive. The time it will take to charge capacitor 90 to this voltage depends on the charging current. The charging current varies dependent on whether transistor 60 is conductive during the "on" state of the oscillator or whether it cannot be rendered conductive due to the transistor unit comprising transistors 20 and 40 being nonconductive. The charging current is of course greater if transistor 60 is conductive. The charging current can, of course, be varied by adjusting the resistive value of potentiometer 130. Consequently, the pulse width is essentially equal to the time it takes to charge capacitor 90 up to the voltage which will turn "off" transistor 80, and thus depends on whether transistor 60 can be rendered conductive and can be varied by adjusting potentiometer 130.

The present circuit is adapted to automatically increase the output pulse width and decrease the output pulse rate whenever the battery 10 output voltage is decreased below the predetermined level. Specifically, the voltage divider consisting of resistors 22 and 24 is ratioed such that when the battery 10 output voltage (junction 11 voltage) drops below the predetermined level, the voltage at base 21 of transistor 20 will be less than the sum of the transistor 20 and transistor 40 threshold voltages, and thus will be insufficient to turn the transistor unit comprising transistors 20 and 40 "on," even when the oscillator is in the "on" state. Normally — when the battery 10 output voltage is greater than the predetermined level — the transistor unit is conducting when the oscillator is in the "on" state. The nonconduction of the transistor unit during the "on" state of the oscillator allows the voltage at junction 70 to become higher than it would be if the transistor unit were conducting; because more current will flow through resistor 84 due to the elimination of the alternative current path through resistor 44 and transistor 40. Consequently, the voltage at junction 70 will be higher during the "on" state of the oscillator with the transistor unit nonconductive than it would if the transistor unit were conductive. Since the voltage at junction 70 will be larger, capacitor 90 will charge to a higher voltage. This will take more time, thus increasing the output pulse width. This higher charge on capacitor 90 will take longer to discharge, thus decreasing the pulse rate. The discharge time is, for example, increased 10% when capacitor 90 is charged to this higher voltage level. This causes the pacemaker to operate at a rate when the battery 10 voltage is below the predetermined level which is slower (typically 10%) than the rate it operates at when the battery 10 voltage is above the predetermined level. The increased output pulse width and the decreased pulse rate are graphically shown in FIG. 2.

Although the invention has been described with reference to a particular cardiac pacemaker embodiment, it will be understood that this embodiment is merely illustrative of one of the applications of the principles of this invention. For example, the automatic increase in the output pulse width feature and the automatic increase in the interval between pulses feature of this invention may be used to advantage in any repetitive pulse generating device. Thus, it will be understood that numerous modifications in this inventive embodiment may be made and other arrangements may be devised without departing from the spirit and scope of the invention.

What is claimed is:

1. In an electromedical pulse generator used to stimulate a selected portion of a living animal body of the type having terminal means adapted for connection to an electrical lead having power source means, and having electrical pulse generating means electrically connected to the power source means for supplying output pulses at a first predetermined rate to the terminal means, each pulse having a first predetermined pulse width sufficient to stimulate the selected portion of the body, the improvement comprising:

means electrically connected to the power source means and to the pulse generating means and responsive to a significant decrease in the power source output below a predetermined level for increasing the output pulse width from said first predetermined pulse width to a second, greater predetermined pulse width for continuing to stimulate the selected portion of the body over a predetermined range of power source outputs less than said predetermined level.

2. A pulse generator according to claim 1 wherein the responsive means comprises means for decreasing the output pulse rate to a second, lower predetermined rate.

3. A pulse generator according to claim 2 wherein the responsive means includes energy storage means having a discharge time which controls the predetermined output 4. A pulse generator according to claim 3 wherein the energy storage means is connected within the responsive means for preventing the transmission of energy from the pulse generating means to the terminal means while the energy storage means is discharging, thereby controlling the predetermined output pulse rate.

5. A pulse generator according to claim 3 wherein the energy storage means includes a capacitor.

6. A pulse generator according to claim 1 wherein the responsive means includes energy storage circuit means having a charging time which determines the output pulse width.

7. A pulse generator according to claim 6 wherein the energy storage circuit means is connected within the responsive means for allowing the transmission of energy from the pulse generating means to the terminal means, only during the time the energy storage circuit means is charging to a certain predetermined level, thereby determining the output pulse width.

8. A pulse generator according to claim 6 wherein the energy storage circuit means includes a capacitor.

9. A pulse generator according to claim 1 wherein the improvement further comprises means for sensing a significant decrease in power source output level including transistor means and means connected to the transistor means for biasing the transistor means for detecting a decrease in the power source output below the predetermined level.

10. A pulse generator according to claim 9 wherein the biasing means comprises resistive voltage divider means, the divider means being connected to ratio the portion of the power source output that is applied to the transistor means for rendering the transistor means conductive only when the power source output is greater than the predetermined level.

11. A pulse generator according to claim 1 further comprising implantable circuit means for adjusting the output pulse width, said circuit means including means for magnetic coupling to a non-implantable external adjusting device, thereby permitting extracorporeal adjustment of the circuit means.

12. A pulse generator according to claim 11 wherein the circuit means is a magnetically coupled potentiometer.

13. In an electromedical pulse generator used to stimulate a selected portion of the body of the type having terminal means adapted for connection to a body implantable electrical lead, having power source means and having electrical impulse generating means electrically connected to the power source means for supplying output pulses to the terminal means at a first predetermined rate, the improvement comprising: means for sensing a significant decrease in the power source output below a predetermined level, means responsive to the sensing means for fixing the output pulse rate at a second diverse predetermined rate over a predetermined range of power source outputs, means connecting the sensing means to the power source means, and means connecting the responsive means to the sensing means and the impulse generating means.

14. In an electromedical pulse generator used to stimulate a selected portion of a living animal body comprising terminal means adapted for connection to an electrical lead, power source means, electrical pulse generating means electrically connected to the power source means for supplying output pulses at predetermined intervals to the terminal means, each pulse having a predetermined pulse width sufficient to stimulate the selected portion of the body, and timing circuit means electrically connected to said power source means and said pulse generating means for establishing the pulse intervals and pulse width, said timing circuit means having a timing capacitor, and charge and discharge circuit means connected to said timing capacitor and said power source means for cyclicly charging said timing capacitor to a maximum charge level over a first time period to establish said pulse width and discharging said timing capacitor over a second time period to establish said pulse rate, the improvement comprising:

means connected to the power source means and to the timing circuit means and responsive to a decrease in the power source output level for increasing the maximum charge level of said timing capacitor and for increasing the pulse width and the pulse intervals.

* * * * *

PO-1050
(5/69)

UNITED STATES PATENT OFFICE
CERTIFICATE OF CORRECTION

Patent No. 3,901,247 Dated September 23, 1975

Inventor(s) Frank R. Walmsley

It is certified that error appears in the above-identified patent and that said Letters Patent are hereby corrected as shown below:

Claim 3, line 40, after "output" insert -- pulse rate. --.

Signed and Sealed this

*sixteenth* Day of *December 1975*

[SEAL]

*Attest:*

RUTH C. MASON
*Attesting Officer*

C. MARSHALL DANN
*Commissioner of Patents and Trademarks*